US008996387B2

(12) United States Patent
Stocker et al.

(10) Patent No.: US 8,996,387 B2
(45) Date of Patent: Mar. 31, 2015

(54) RELEASE OF TRANSACTION DATA

(75) Inventors: Thomas Stocker, Munich (DE);
Michael Baldischweiler, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 1025 days.

(21) Appl. No.: 13/063,042

(22) PCT Filed: Sep. 8, 2009

(86) PCT No.: PCT/EP2009/006513
§ 371 (c)(1),
(2), (4) Date: Mar. 9, 2011

(87) PCT Pub. No.: WO2010/028805
PCT Pub. Date: Mar. 18, 2010

(65) Prior Publication Data
US 2011/0166863 A1    Jul. 7, 2011

(30) Foreign Application Priority Data

Sep. 9, 2008    (DE) .................. 10 2008 046 339

(51) Int. Cl.
*G10L 15/00*    (2013.01)
*G10L 17/00*    (2013.01)
(Continued)

(52) U.S. Cl.
CPC  *G06F 21/34* (2013.01); *G07F 7/10* (2013.01); *G10L 21/00* (2013.01); *G10L 25/48* (2013.01); *G10L 17/00* (2013.01)
USPC ........... 704/275; 704/231; 704/246; 704/247; 704/249; 704/250; 704/258; 704/270; 704/271; 379/88.01

(58) Field of Classification Search
CPC ......... G10L 13/00; G10L 15/00; G10L 15/24; G10L 17/00; G10L 17/005; G10L 21/00; G07F 7/10; G07F 7/1008; G07F 7/1016; G07F 7/1025; G07F 7/12; H04M 2203/105; H04M 2215/7846; G06F 21/30; G06F 21/31; G06F 21/32; G06F 21/33; G06F 21/44; G06F 21/445

USPC ......... 704/231, 246, 251, 250, 258, 270, 275, 704/271; 379/88.01
See application file for complete search history.

(56) References Cited

U.S. PATENT DOCUMENTS 6,023,688 A * 2/2000 Ramachandran et al. ...... 705/44
7,083,090 B2 * 8/2006 Zuili .............................. 235/383
(Continued)

FOREIGN PATENT DOCUMENTS

CN    1912882 A    2/2007
CN    101335755 A    12/2008
(Continued)

OTHER PUBLICATIONS

International Search Report in PCT/EP2009/006513, Sep. 9, 2008.
(Continued)

*Primary Examiner* — Paras D Shah
(74) *Attorney, Agent, or Firm* — Workman Nydegger

(57) ABSTRACT

For clearing transaction data selected for a processing, there is generated in a portable data carrier (1) a transaction acoustic signal (003; 103; 203) (S007; S107; S207) upon whose acoustic reproduction by an end device (10) at least transaction data selected for the processing are reproduced superimposed acoustically with a melody specific to a user of the data carrier (1) (S009; S109; S209). The generated transaction acoustic signal (003; 103; 203) is electronically transferred to an end device (10) (S108; S208), which processes the selected transaction data (S011; S121; S216) only when the user of the data carrier (1) confirms vis-à-vis the end device (10) an at least partial match both of the acoustically reproduced melody with the user-specific melody and of the acoustically reproduced transaction data with the selected transaction data (S010; S110, S116; S210).

22 Claims, 4 Drawing Sheets

Figure 1:
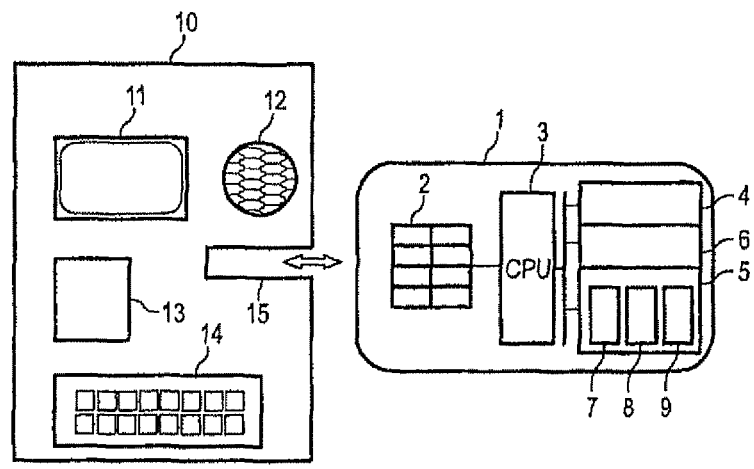

(51) Int. Cl.
*G10L 13/00* (2006.01)
*G10L 21/00* (2013.01)
*G10L 25/00* (2013.01)
*G06F 21/00* (2013.01)
*G06F 21/34* (2013.01)
*G07F 7/10* (2006.01)
*G10L 25/48* (2013.01)

(56) References Cited

U.S. PATENT DOCUMENTS

| | | | |
|---|---|---|---|
| 7,089,214 B2 * | 8/2006 | Wang | 705/64 |
| 7,565,177 B2 * | 7/2009 | Kuroda | 455/567 |
| 7,966,177 B2 * | 6/2011 | Geiger | 704/232 |
| 2004/0039919 A1 | 2/2004 | Takayama et al. | |
| 2004/0133789 A1 * | 7/2004 | Gantman et al. | 713/189 |
| 2005/0185779 A1 * | 8/2005 | Toms | 379/114.14 |
| 2005/0203841 A1 * | 9/2005 | Hoffman et al. | 705/39 |
| 2006/0095369 A1 * | 5/2006 | Hofi | 705/39 |
| 2006/0106606 A1 * | 5/2006 | Labaton | 704/250 |
| 2007/0043681 A1 * | 2/2007 | Morgan et al. | 705/67 |
| 2007/0101010 A1 * | 5/2007 | Ellison et al. | 709/229 |
| 2007/0271157 A1 * | 11/2007 | Rosenberg | 705/28 |
| 2008/0126097 A1 * | 5/2008 | Sarid et al. | 704/270.1 |
| 2008/0140420 A1 * | 6/2008 | Lee | 704/273 |
| 2008/0154773 A1 * | 6/2008 | Ranzini et al. | 705/44 |
| 2008/0179403 A1 | 7/2008 | Endlebardt et al. | |
| 2009/0055193 A1 * | 2/2009 | Maislos et al. | 704/273 |
| 2010/0099391 A1 * | 4/2010 | Warakagoda et al. | 455/414.1 |
| 2010/0106647 A1 * | 4/2010 | Raman | 705/67 |

FOREIGN PATENT DOCUMENTS

| | | |
|---|---|---|
| DE | 4142964 | 7/1993 |
| EP | 1 487 141 A1 | 12/2004 |
| EP | 1659546 | 5/2006 |
| EP | 1046976 | 7/2006 |

OTHER PUBLICATIONS

German Search Report Corresponding to German Application No. 10 2008 046 339.6, May 8, 2009.
Chinese Search Report from Corresponding Chinese Application No. 20098013 50601.1, Mar. 15, 2013.

* cited by examiner

RELEASE OF TRANSACTION DATA

The present invention relates to a method, realized on a portable data carrier, for clearing transaction data selected for a processing, to such a data carrier, and to a transaction system having such a data carrier.

The execution of a transaction by a local transaction terminal or by a transaction server accessible via a data communication network is frequently prompted by a data communication with a portable data carrier of a user. Such transactions can be for example monetary transactions or the like, e.g. a cash removal with a chip card at a local bank terminal or a bank transfer to be executed by a transaction server of a bank and which is prompted e.g. by means of a personalized USB memory element or a mobile communication card via a local input/output device, e.g. via a stationary terminal, a personal computer, a mobile radio end device or the like, which does not execute the actual transaction but only provides the particular data carrier with an access to the transaction server. In this connection there is frequently the problem that such a transaction terminal or input/output device directly connected to the data carrier is not sufficiently secured to exclude any tampering with the transaction by a third party. For this purpose there is required at least a secured, tamperproof data transfer connection between the data carrier and the transaction terminal or input/output device.

The usual entry of a personal identification number (PIN) on a local transaction terminal and its comparison with a reference number stored on the data carrier offers, besides the authentication of the user vis-à-vis the data carrier, no further securing of the transaction terminal or the data communication connection to the data carrier, so that it cannot be ensured that the transaction actually desired by the user is executed, and not one that has been tampered with by a third party. On these premises, DE 41 42 964 C2 proposes first ensuring the trustworthiness of the transaction terminal before the input of a PIN by the user. For this purpose, a data word deposited on the data carrier and known only to the user is transferred in encrypted form to the transaction terminal, decrypted there and displayed on a display device of the transaction device, so that upon correct display of the data word the user can ascertain the trustworthiness of the transaction device. The security of the transaction device is thus guaranteed by encryption and decryption of the secret data word by means of corresponding encryption and decryption keys.

In EP 1 659 546 A1 the transaction security is improved by the data carrier electronically generating an acoustic signal of a spoken text and playing it via a transaction terminal, thereby making possible a direct communication between the data carrier and the user while largely avoiding the insecure transaction terminal. The proposed data carrier has for this purpose a special acoustic interface with an audio output via which the generated acoustic signal on the data carrier can be played and transferred for reproduction to a loudspeaker/earphone device of the transaction terminal. The spoken text reproduced through the acoustic signal can contain for example an instruction to the user for inputting a modified PIN. If the user reacts to the spoken text in the intended fashion, the desired transaction is executed by the transaction terminal.

Against this background, it is the object of the present invention to make possible a secure execution of a transaction on a basically insecure end device via a secured data communication connection between a data carrier and an end device.

This object is achieved according to the invention by a method, a portable data carrier and a transaction system having the features of the independent claims. The claims dependent thereon describe advantageous embodiments and developments of the invention.

A transaction is executed by the processing of transaction data which define the desired transaction. According to the invention, the processing of transaction data is cleared by a user of a portable data carrier connected to an end device, by the data carrier generating a transaction acoustic signal which reproduces, in acoustically superimposed fashion, a melody known to the user and specific to him, and transaction data previously specified vis-à-vis the end device by the user and defining the desired transaction, electronically transferring the generated transaction acoustic signal to the end device, and the end device acoustically reproducing the electronically received transaction acoustic signal. In this connection, an acoustically superimposed reproduction of the user-specific melody and further data, such as the desired transaction data, is understood to be an at least partly overlapping reproduction, preferably a substantially simultaneous reproduction, of the user-specific melody and the further data. The transaction data are processed only when the user clears vis-à-vis the end device an at least partial match of the reproduced melody with the user-specific melody known to him and present on the data carrier, and a match of the reproduced transaction data with the previously specified transaction data.

The transaction acoustic signal is thus suitable in particular for the user being able to recognize, as a result of the reproduction of the transaction acoustic signal by the end device, both an at least partial match of the acoustically reproduced melody with the user-specific melody and a match of the acoustically reproduced transaction data with the selected transaction data, in order to confirm this for clearing the transaction data vis-à-vis the end device. For this reason, the transaction acoustic signal is generated by acoustic superimposition of a user acoustic signal present on the data carrier and reproducing the user-specific melody and of a speech acoustic signal reproducing the transaction data in spoken or in another recited fashion. The speech acoustic signal is optionally generated by an acoustic conversion of the transaction data, initially only present textually, to the speech acoustic signal, e.g. by a suitable speech generator, a synthesizer or a digital recording or conversion of the transaction data recited by the user.

The clearance of the transaction data can consist for example in a one-sided action of the user vis-à-vis the end device without any further participation of the data carrier, e.g. by pressing a confirmation button set up on the end device, or inputting a confirmation statement, or also require a further data communication between the end device and the data carrier.

Hereinafter, an end device will be understood to be either a transaction terminal directly connectable to the data carrier and able to process cleared transaction data itself, or a strict input/output device or reproducer which communicates with the data carrier only within the framework of the grant of clearance, leaving the further transaction processing to a remote transaction server or the like.

The present invention makes use of the fact that a melody specific to the user of the data carrier can be transferred to the end device in the form of a digital transaction acoustic signal, from whose file structure said melody can initially not to be derived and which is therefore difficult to tamper with. The user-specific melody will hereinafter be understood to be in particular a melody or other melodic sound impression to be associated with the user, e.g. his favorite melody or another melody that is for example downloadable from the Internet, which the user himself can determine. He can determine the melody for example by selection from a list on a server or from the Internet or by supplying a corresponding user acoustic signal. Likewise, the user can determine the user-specific melody by singing, humming, playing and recording it using a suitable recording apparatus which generates a digital user acoustic signal with the performed melody.

Because the melody can also be a well-known or popular melody, it is additionally possible to defamiliarize or conceal it to thereby obtain a further-reaching user individualization, through which the well-known melody is no longer as easily recognizable, on the one hand, and it is more difficult to tamper with or spectrally analyze the corresponding transaction acoustic signal or extract the user-specific melody, on the other hand. The defamiliarization can consist for example in a characteristic noise acoustically superimposed on the melody, or another additional complex acoustic impression, which, even when it is intercepted by a third party, cannot readily be copied together with the user-specific melody by said party. In contrast to known solutions, such a melody is substantially less susceptible to tampering, on account of a user's complex spectral auditory sensation, than for example numerical or textual information or a spoken instruction to the user.

For clearing a processing of the transaction data it is sufficient, besides the match of the transaction data reproduced by the end device with the transaction data specified by the user, when the user ascertains at least a partial match of the reproduced melody with the user-specific melody, e.g. the user-specific melody defamiliarized by a superimposed interference noise, or a part of said melody.

Through the acoustic reproduction of the generated transaction acoustic signal, the user hears the user-specific melody known to him, on the one hand, and the transaction data already previously selected by him, on the other hand. The user can thus check, on the one hand, whether the transaction acoustic signal was transferred without tampering, because he otherwise cannot identify the reproduced melody, and can check, on the other hand, whether the transaction data previously selected by him vis-à-vis the end device were transferred correctly to the data carrier and are present there without tampering.

In particular, it is advantageous when the user acoustic signal is acoustically superimposed with the user-specific melody, and the speech acoustic signal with the selected transaction data, upon generation of the transaction acoustic signal such that upon an acoustic reproduction of the generated transaction acoustic signal the acoustic reproduction of the user-specific melody, on the one hand, and that of the transaction data, on the other hand, begins and ends substantially simultaneously, so that preferably neither of the two acoustic signal components is reproduced separately and unsuperimposed. This avoids an easy analysis/synthesis of the user-specific melody and of the transaction data on the basis of any acoustic signal components reproduced in isolation.

Likewise, the tamper resistance and the recognizability by the user can be increased further by not only the user-specific melody, but also the speech acoustic signal reproducing the transaction data, being user-individualized, e.g. by a speech acoustic signal being generated that reproduces the transaction data recited, sung or otherwise performed by the user. For this purpose, the transaction data selected for a processing are converted to a speech acoustic signal before the generation of the transaction acoustic signal, or the data carrier is provided electronically with a speech acoustic signal reproducing the selected transaction data, upon whose acoustic reproduction the transaction data are reproduced as performed by the user.

For specifying the desired transaction, the user selects on the end device, for example via an interactive input device such as a keyboard, the corresponding transaction data or a transaction designation uniquely associated with the desired transaction data, e.g. a transaction number, a transaction name or the like.

The selected transaction data, or preferably their transaction designation, is transferred electronically to the data carrier, where the electronically received transaction data, or the transaction data associated with the electronically received transaction designation, are converted to an acoustically reproducible speech acoustic signal and acoustically superimposed with the user-specific melody digitally present on the data carrier as a user acoustic signal. Upon the acoustic superimposition the speech acoustic signal with the selected transaction data is suitably integrated or spectrally added into the user acoustic signal, thereby generating the transaction acoustic signal to be transferred to the end device and reproduced thereby.

The user acoustic signal present on the data carrier is preferably already loaded upon the personalization of the data carrier by a data carrier manufacturer or issuer, so that the user acoustic signal is user-individualized and constitutes a part of the personalization of the data carrier. Also, there can be deposited on the data carrier, within the framework of a personalization, several such user acoustic signals with respectively different or modified user-specific melodies. Such personalized data carriers are for example chip cards, smart cards, mobile communication cards or similar transaction cards.

Preferably, the transaction data selected by the user, or the transaction designation of the selected transaction data, are in turn linked by the data carrier with a unique transaction identification supplied by the data carrier. While the transaction designation firmly associated with the relevant transaction data can in principle be known to third parties and only serves to facilitate the selection of transaction data by the user, the variable transaction identification is initially known only to the data carrier and therefore represents a security feature, because its correct knowledge suggests an untampered-with data communication connection between the data carrier and the end device.

Therefore, the data carrier preferably generates and transfers a transaction acoustic signal to the end device which reproduces, besides the user-specific melody and the speech acoustic signal of the selected transaction data, also a speech acoustic signal acoustically superimposed with the transaction identification. In so doing, the converted transaction data and the converted transaction identification are acoustically superimposed with the user acoustic signal deposited on the data carrier, e.g. spectrally added. The two speech acoustic signals can be acoustically superimposed with the user acoustic signal almost arbitrarily here, for example temporally one after the other or interleaved, e.g. in different pitches, accents or the like. However, upon the acoustic reproduction of the generated transaction acoustic signal no portion of the user-specific melody is preferably reproduced in isolation, i.e. without simultaneous reproduction of the transaction data or of the transaction identification. Conversely, no portion of the transaction data or of the transaction identification is reproduced in isolation either, i.e. without simultaneous reproduction of the user-specific melody.

Upon the simultaneous reproduction, it is in particular possible to exploit the special property of the human sense of hearing of being able to perceive different auditory impressions in spectrally resolved fashion. It is of course also possible to generate, transfer and reproduce two transaction acoustic signals which reproduce the user-specific melody superimposed acoustically with the transaction identification, on the one hand, and with the transaction data, on the other hand.

Upon the reproduction of the transaction acoustic signal by the end device, preferably both the user-specific melody and the transaction data and transaction identification are thus rendered to the user in acoustically superimposed fashion, e.g. spoken, sung or otherwise recited. The user can then confirm the at least partial match of the reproduced melody with the user-specific melody known to him and the match of the acoustically reproduced transaction data with the previously selected transaction data, by electronically inputting the likewise acoustically reproduced transaction identification via an input device of the end device. The input transaction identification is then transferred electronically to the data carrier, which compares it with the transaction identification generated thereby.

The data carrier generates in this connection preferably at the onset of the method according to the invention variable, mutually different transaction identifications for all possible transaction data basically selectable by a user, or their transaction designations. While the transaction data and their transaction designations are subsequently transferred electronically to the end device for selection by the user, however, the individual transaction identifications remain on the data carrier. In this manner it remains completely unknown to third parties which transaction identification is associated with certain transaction data. Upon further transactions desired by the user there can then be employed the respective transaction identification of the relevant transaction data, that was already generated at the onset of the method.

Alternatively, a transaction identification can also be individually generated by the data carrier for already selected transaction data only after the data carrier has electronically received the transaction data selected by the user vis-à-vis the end device, or their transaction designation. Here, too, the associated, individual transaction identification remains on the data carrier and is unknown to third parties. Preferably, the transaction identification is newly generated as a random number or random character string each time it is required by the data carrier.

Because the transaction identification is generated by the data carrier preferably in transaction-individual fashion and is therefore unknown to the user until its acoustic reproduction by the end device, the user confirms, by correctly inputting it, a recognition of the user-specific melody and of the selected transaction data, on the one hand, and it is made more difficult or even pointless for a third party to tamper with the data communication connection between the end device and the data carrier, on the other hand, because the transaction identification—unlike the user-specific melody known at least also to the user—is known only to the data carrier.

A portable data carrier according to the invention accordingly comprises at least a processor, a memory in which there is stored at least the user acoustic signal which reproduces the melody specific to the user, and a data communication interface for data communication with the end device. Further, the data carrier comprises a control device, for example in the form of a software application executable by the processor, which controls and checks the method according to the invention on the data carrier side. The control device generates and transfers a transaction acoustic signal via the data communication interface to the end device, which acoustically reproduces the user-specific melody and the transaction data.

The control device is set up in particular to generate the transaction acoustic signal by acoustic superimposition of the stored user acoustic signal and of at least one speech acoustic signal which reproduces the selected transaction data, such that upon its acoustic reproduction at least the selected transaction data are reproduced superimposed acoustically with the user-specific melody.

Such a portable data carrier forms together with a corresponding end device a transaction system according to the invention, whereby the end device is set up to acoustically reproduce via a reproducing device transaction acoustic signals received from the data carrier, and to electronically transfer to the data carrier data input by the user via an input device of the end device, such as a transaction designation for selection of transaction data or a confirming transaction identification. Further, the end device is set up, depending on the function and embodiment, to process cleared transaction data itself as a transaction terminal, or, preferably, to only fetch the clearance of the transaction data by the user or by his data carrier and leave the actual processing of the transaction data to a transaction server or the data carrier. In this case, a transaction system according to the invention also comprises a transaction server connected to the end device or to the data carrier via a suitable data communication connection.

If not only a one-sided action of the user vis-à-vis the end device is necessary for clearance of the transaction data after the electronic transfer of the transaction acoustic signal to the end device, the control device, in a preferred embodiment of the invention, receives a confirmation signal from the end device—preferably by electronic transfer of the transaction identification associated with the selected transaction data—according to which the melody acoustically reproduced by the end device at least partly matches the user-specific melody, and the acoustically reproduced transaction data match the transaction data selected by the user. The data carrier then checks, after receipt of the transaction identification input on the end device by the user, whether the received transaction identification matches the transaction identification deposited on the data carrier and previously generated thereby. In case of a match of the received with the deposited transaction identification, the control device of the data carrier answers the confirmation of the user-specific melody and of the transaction data with a corresponding clearance signal to the end device, thereby finally clearing the processing of the selected transaction data vis-à-vis the end device.

In one implementation variant, the data carrier generates as a clearance signal a clearance data signal which preferably again comprises at least the transaction data. The clearance data signal can comprise, besides the transaction data, further data components, e.g. a digital signature of the data carrier or of its user, which is verifiable with a corresponding verification key by the end device.

In a further implementation variant, the data carrier generates as a clearance signal a clearance acoustic signal which reproduces in acoustically superimposed fashion at least the user-specific melody and a clearance code generated by the data carrier, as the speech acoustic signal, and transfers the clearance acoustic signal to the end device for acoustic reproduction. In this connection, the clearance code is individually generated, as is the transaction identification, such that it is unknown to third parties, e.g. in the form of a random character string or the like. The transaction data selected and then confirmed are processed when the user correctly inputs the acoustically reproduced clearance code to the end device, i.e. when a clearance code input by the user as a result of the acoustic reproduction matches the clearance code generated by the data carrier and incorporated in the clearance acoustic signal. Selectively, the transaction data can also be either additionally incorporated in the clearance acoustic signal or generated as a further acoustic signal and transferred to the end device.

Preferably, a transaction list is created by the data carrier, for preparation of the selection of transaction data, from those transaction data that are registered for processing on the data carrier, and is transferred electronically to the end device for selection by the user. In this manner it is guaranteed that the user cannot authorize arbitrary transactions, but only those registered. The transaction list is transferred to the end device and preferably displayed on a display device of the end device, where the user can select the desired transaction data or their firmly associated transaction designation by inputting via an input apparatus.

Upon the creation of the transaction list, the respectively mutually different transaction identifications can also be generated and uniquely associated. These variable transaction identifications can be renewed for the total transaction list regularly, e.g. before each further transaction, so that it is not possible for a third party to infer the respective transaction identification from the selected transaction data. Alternatively, a transaction identification can also be generated individually for already selected transaction data or their transaction designation after the latter have been electronically transferred from the end device to the data carrier after the selection from the transaction list by the user.

A further aspect of the present invention relates to the registration of new transaction data on the portable data carrier. In this connection, transaction data to be newly registered can be input via an input mask displayed on a display device of the end device from the data carrier. After receipt by the data carrier of the input transaction data to be registered, the data carrier generates and transfers a transaction acoustic signal to the end device, upon whose acoustic reproduction at least the user-specific melody and the transaction data to be newly registered are reproduced in acoustically superimposed fashion. Preferably, the transaction acoustic signal is generated such that it also reproduces in acoustically superimposed fashion an individually generated transaction identification which is linked uniquely with the transaction data to be newly registered.

Upon the acoustic reproduction of the transaction acoustic signal by the end device, the user hears the transaction data to be newly registered and can confirm them vis-à-vis the end device. As also in the above-described clearance method, this makes it possible to verify that the transaction data to be newly registered specified by the user have been correctly transferred from the end device to the data carrier. If the transaction acoustic signal additionally acoustically reproduces the transaction identification associated with the transaction data to be registered, the user inputs it via an input device of the end device as confirmation of the user-specific melody and of the transaction data to be registered. If the transaction identification input by the user matches the individual transaction identification generated by the data carrier, the transaction data input via the input mask are registered on the data carrier, for example by being entered in a transaction list or transaction database, for future processing by the end device.

As in the processing of already registered transaction data, transaction data to be newly registered are thus also registered for later processing only when the user confirms the transaction data to be registered in the form in which they are present to the data carrier after being specified by the user. By the additional confirmation of the transaction data by input of the corresponding transaction identification, it is possible to verify a trustworthiness of the data communication connection.

A central feature of the present invention is the generation of transaction acoustic signals for clearance or registration of transaction data, which comprise several, acoustically superimposed acoustic signals, namely, the user acoustic signal with the user-specific melody, on the one hand, and speech acoustic signals with transaction data that are selected or to be registered or with a transaction identification or a confirmation code, on the other hand. The user-specific melody represents in this connection a signature melody selected by the user or generated for this purpose by him, for example a selected digitized favorite melody or a melody sung by him or recorded with a (digital) instrument. This melody is preferably defamiliarized, e.g. by a modulation, a superimposed noise or the like, in order to improve the individualization and the recognition effect, on the one hand, and to make more difficult the spectral analysis of the transaction acoustic signal, on the other hand.

In general, there can also be employed, instead of the user-specific melody, a user-specific background noise. The background noise should preferably be suitable for being recognized by the user after the superimposition with the transaction acoustic signal. Moreover, it should be superimposed such that there arises from the superimposition an additional background noise for the transaction data to be acoustically reproduced.

The individual single acoustic signals to be reproduced by the end device (i.e. the user acoustic signal and at least one speech acoustic signal) are preferably acoustically superimposed upon the generation or synthesizing of the transaction acoustic signal by the control device or another suitable component of the data carrier such that for example the speech acoustic signal with the transaction data cannot be extracted from the transaction acoustic signal such that the transaction data can be reproduced separately and in acoustically recognizable fashion through an acoustic reproduction of such an extracted acoustic signal. Such an analysis of the speech acoustic signals acoustically superimposed in the transaction acoustic signal and of the superimposed user acoustic signal is prevented in particular by the reproduction of the user acoustic signal, on the one hand, and of the possibly superimposed speech acoustic signals, on the other hand, substantially simultaneously beginning and simultaneously ending upon the acoustic reproduction of the transaction acoustic signal.

A tampering with the transaction acoustic signal by a third party is excluded for example by it not being possible to replace the speech acoustic signal with the transaction data (or with the transaction identification) in the synthesized transaction acoustic signal without residue by a tampered-with speech acoustic signal with forged transaction data (or a forged transaction identification), because on account of the complexity of such synthesized transaction acoustic signals the user-specific melody cannot be superimposed with forged speech acoustic signals without the user noticing this tampering upon the reproduction of the melody. This is possible in particular when the frequency spectrum utilized by the user-specific melody and the frequency spectrum of a superimposed speech acoustic signal overlap such that linear filtering techniques can be excluded for manipulative analysis of the transaction acoustic signal, because such a tampering with a superimposed speech acoustic signal always also entails an (audible) impairment of the user-specific melody in the transaction acoustic signal.

The described synthesizing of the transaction acoustic signal likewise prevents the electronically transferred transaction acoustic signal from being analyzed by a third party manually or automatically by malware installed on the end device. It is certainly not possible for the transaction acoustic signal to be split into individual syllables or sounds and a tampered-with speech acoustic signal to be assembled therefrom, because this would of course also falsify the simultaneously reproduced melody in a manner audible to the user. The melody thus not only functions as a secret for an authentication of the user, but furthermore also constitutes a tamper protection for the simultaneously reproduced speech acoustic signals with the transaction data or the transaction identification, because any tampering with the speech acoustic signals will always be recognizable to the user in the reproduced melody.

Figure 2:
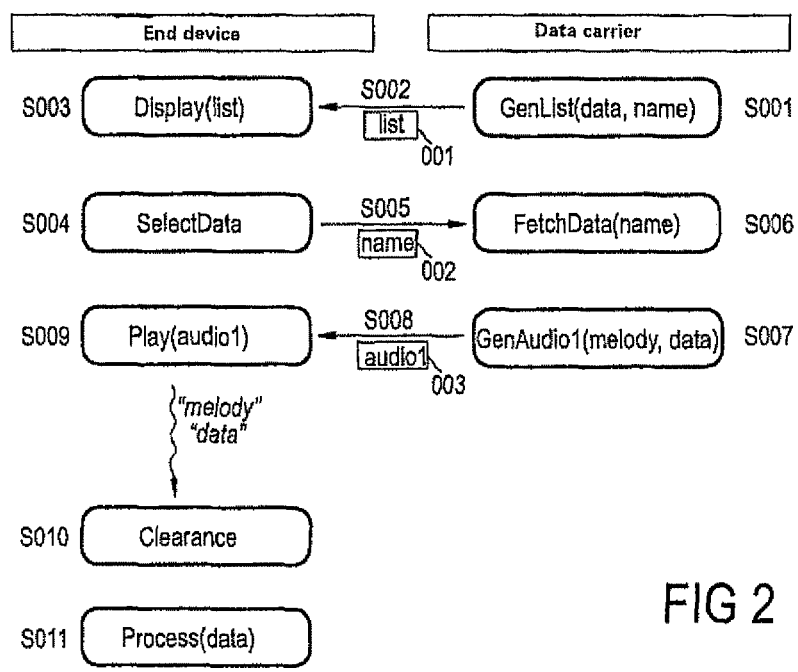
Figure 2A:
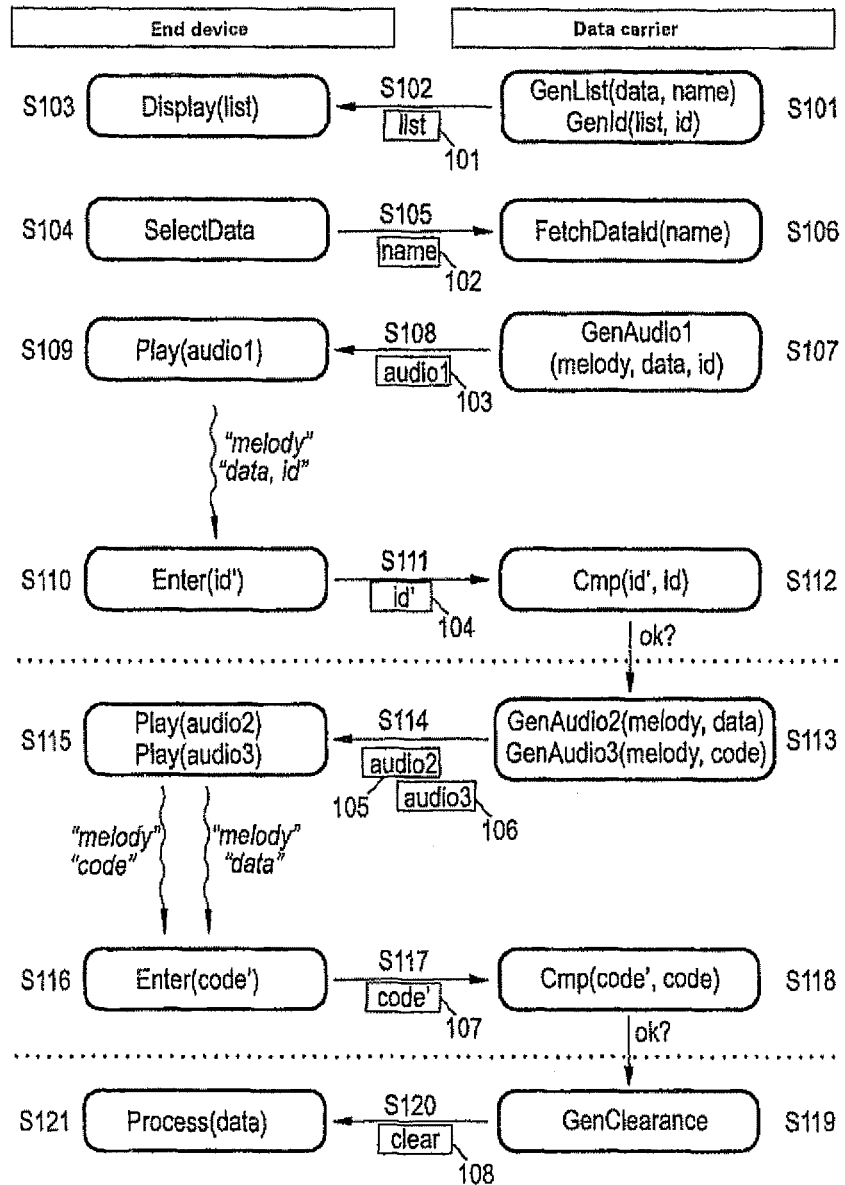
Figure 2B:
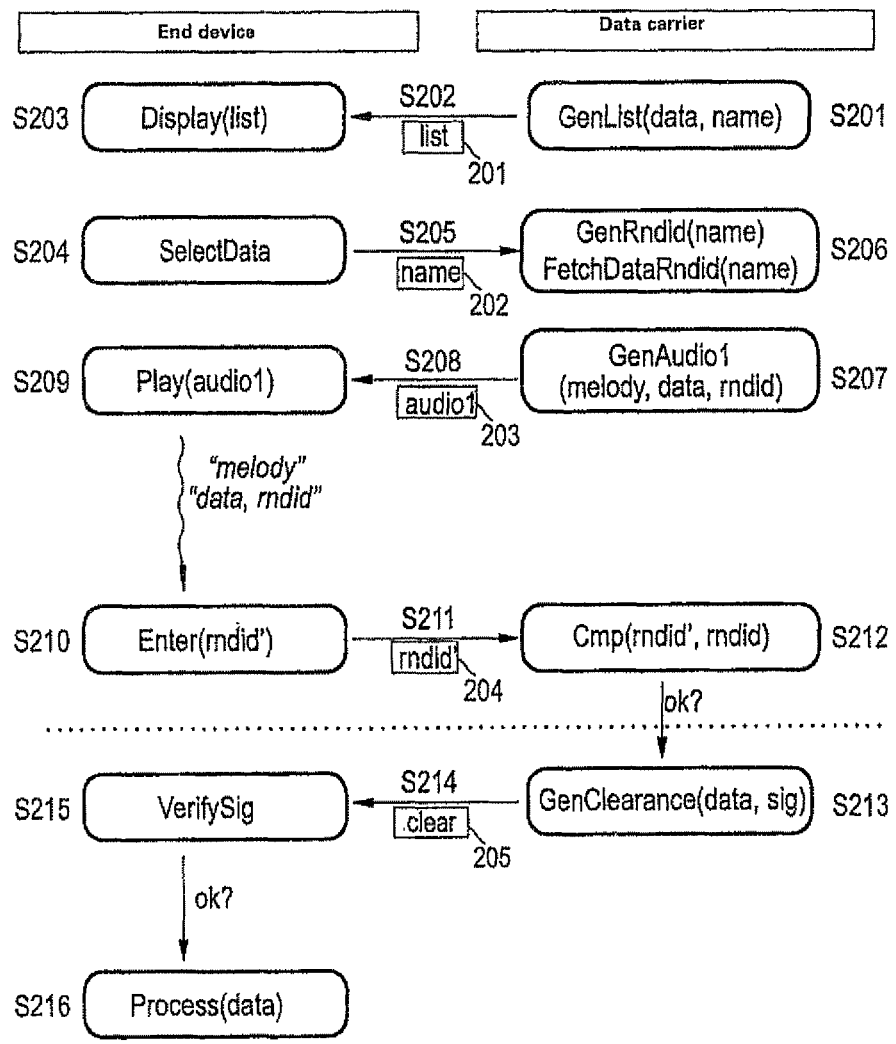
Figure 3:
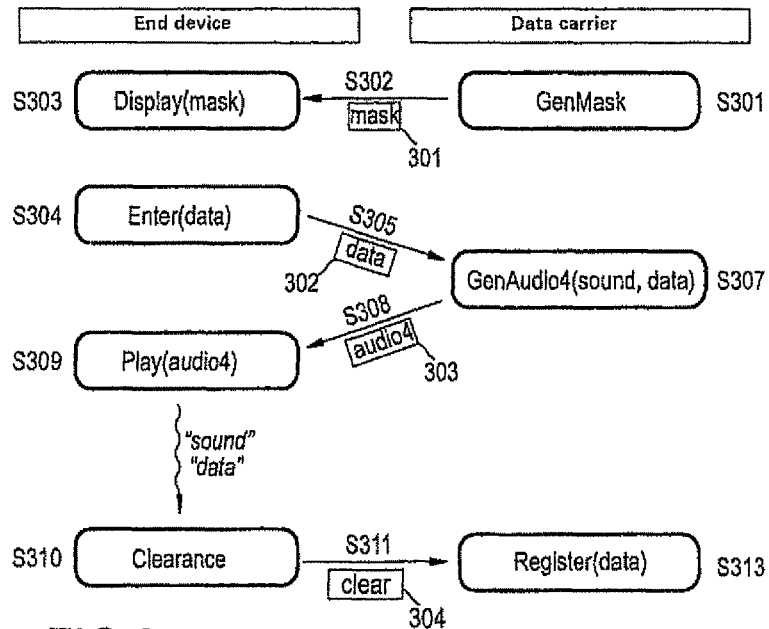
Figure 3A:
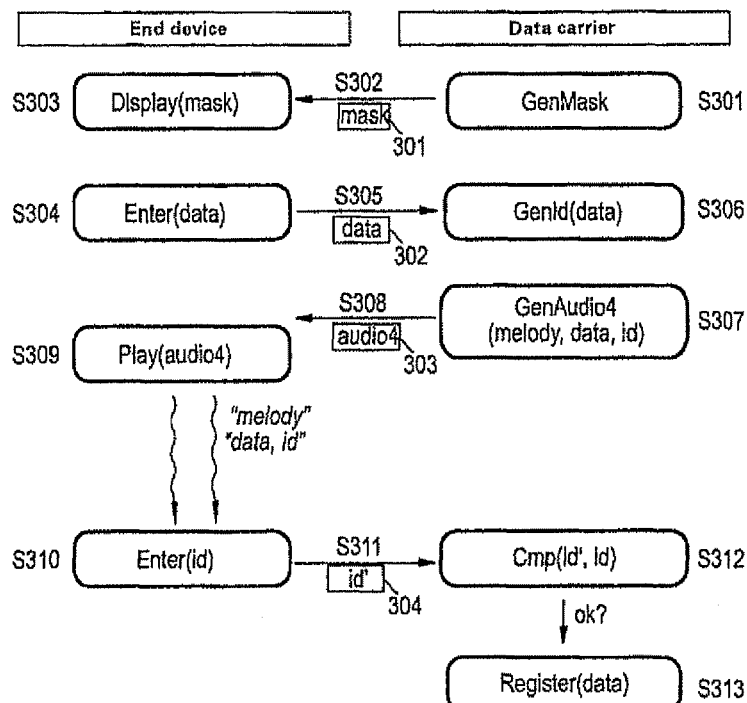

Further features and advantages of the invention will result from the following description of embodiment examples according to the invention and further alternative embodiments in connection with the attached drawings, which show:

FIG. 1 a transaction system according to the invention comprising a portable data carrier according to the invention, and an end device;

FIG. 2 a method according to the invention for clearing transaction data in the transaction system according to FIG. 1;

FIG. 2a a first implementation variant of the method for clearing transaction data according to FIG. 2; and FIG. 2b a second implementation variant of the method for clearing transaction data according to FIG. 2;

FIG. 3 a method for registering transaction data in the transaction system according to FIG. 1; and FIG. 3a an implementation variant of the method for registering transaction data according to FIG. 3.

FIG. 1 shows a transaction system consisting of a portable data carrier 1 and an end device 10. The portable data carrier 1 can be an arbitrary portable data carrier, for example a chip card, a USB storage medium, a secure multimedia card, a mobile communication card inserted in a mobile radio end device, or the like, which is equipped with a data communication interface 2 for data communication with a corresponding interface 15 of the end device 10 as well as with a processor 3 (CPU) for executing application programs. Further, the data carrier 1 comprises a memory assembly consisting of a RAM working memory 4, rewritable flash or EEPROM memory 5, and a permanent ROM memory 6. Furthermore, the data carrier 1 can have, besides the contact interface 2, further interfaces for a data communication with the end device 10 or a transaction server, e.g. a contactless interface in the form of an antenna.

The end device 10 can be an arbitrary transaction terminal or data terminal, a vending machine, a bank terminal, a computer, such as a personal computer or a portable laptop, a mobile radio end device, a personal digital assistant (PDA) or the like, which comprises a control device 13 for clearing transaction data when prompted by the data carrier 1. Additionally, the end device 10 comprises a data communication interface 15 for data communication with the portable data carrier 1 and can be connected to a data communication network, for example to the Internet or a company-wide network. Depending on the type and the tasks of the end device 10, the control device 13 can process cleared transaction data directly, e.g. upon a cash payout at a bank terminal.

For clearing transaction data, a user of the data carrier 1 establishes a data communication connection between the data carrier 1 and the end device 10 in order to select the desired transaction or the relevant transaction data, and prompt their processing, via an input device 14 and an optical display device 11, e.g. a keyboard and a screen, and an acoustic reproducing device 12, e.g. a loudspeaker or earphone output.

The processing of cleared transaction data can also be performed by a further client or server computer in interaction with the data carrier 1, which is reachable for the end device 10 or for the data carrier 1 via the data communication network, e.g. in the case of an online banking order which is prompted with the data carrier 1 and finally executed by a transaction server in a computer center of a bank. In this case, the end device 10 acts as a simple optical/acoustic reproduction end device, which comprises substantially only the display device 11, the reproducing device 12, the input device 14 and the data communication interface 15, but no further devices or resources for processing cleared transaction data. Such a reproduction end device then carries out, as a strict input/output device only providing the data carrier with further communication interfaces, the clearance methods in interaction with the data carrier 1 as described hereinafter in connection with FIGS. 2, 2a and 2b, while, for the processing of cleared transaction data, it only provides a data communication connection to a transaction client/server, which carries out the actual transaction.

In connection with the present invention, a transaction can be for example a financial transaction carried out by the end device 10 or by a further transaction client/server, e.g. a bank transfer or payout of cash determined by transaction data, or an arbitrary other data transaction, for example a download of commercial media data from a server or the like. Likewise, a transaction can be an arbitrary other operation, to be prompted by the user, of the end device 10 or of a transaction client/server accessible to the data carrier, for example a desired data manipulation, such as an encryption or decryption of data, a communication order, e.g. an e-mail or an SMS, a data clearance or the like.

In the flash memory 5 of the data carrier 1 there are different application programs executable by the processor 3, and data for realizing the data communication with the end device 10, namely, at least a control device 7 which controls the data communication with the end device 10 and generates and processes the necessary data, a digital user acoustic signal 8 upon whose acoustic reproduction a melody known to the user of the data carrier 1 and specific to him is reproduced, and registered transaction data 9 which define transactions basically selectable by the user and executable by the end device 10 or a transaction server, e.g. in the form of a transaction list or a transaction database. The user acoustic signal 8 can be present in an arbitrary suitable digital data format which can be acoustically reproduced by a sound card or another acoustic reproducing device 12 of the end device 10, for example as an MP3 file, WAV file or another suitable digital audio file.

The user-specific melody reproduced by the user acoustic signal 8 can be an arbitrary melody selected by the user, which preferably possesses a sufficient recognition effect and furthermore preferably permits an optimal individualization or personalization of the data carrier to the user. The user-specific melody can be for example a favorite melody or another popular melody which the user selects from a corresponding selection, e.g. on the Internet, or determines in another way, e.g. by singing, humming or playing it on a suitable (digital) instrument. Additionally, the user-specific melody can be defamiliarized by noises or other audio effects, such as a modulation, in order to obtain a further-reaching individualization and make it more difficult to tamper with the user acoustic signal 8.

It is expedient, in the case of data carriers 1 that are personalized anyway, such as chip cards, smart cards or mobile communication cards, to already write the user acoustic signal 8 with the digitized user-specific melody to the data carrier 1 upon the personalization by the data carrier issuer, e.g. a credit institution or a mobile network operator. The user then makes e.g. his favorite melody known to the data carrier issuer, e.g. in the form of an MP3 file, which is then written to the flash memory 5 as a digital user acoustic signal 8 upon personalization. Within the framework of the personalization there can also be performed a possible defamiliarization of the user-specific melody e.g. according to the user's specifications. It is likewise possible for several user acoustic signals 8 with different user-specific melodies to be loaded to the data carrier 1, whereby the melodies (or the corresponding user acoustic signals 8) to be respectively employed by the data carrier 1 for a transaction clearance (cf. FIGS. 2, 2a, 2b) or a transaction registration (cf. FIGS. 3, 3a) can then be determined currently in each case, e.g. by a random selection by the data carrier 1 or an active selection of the user, or by another suitable procedure.

In FIGS. 2, 2a and 2b, the processing of the cleared transaction data is shown for simplicity's sake respectively as a method step S011, S121, S216 to be executed by the end device 10. As explained above, this need not necessarily be the case, but rather the processing steps S011, S121, S216 can equally well be executed by a transaction server which is connected to the end device 10 or the data carrier 1 via a data communication network. Thus, the processing steps S011, S121, S216 are to be understood in such a way that the processing can also be effected by a remote transaction server or by the data carrier itself.

FIG. 2 illustrates, on the basis of the transaction system of FIG. 1, a preferred embodiment of a method for clearing transaction data vis-à-vis the end device 10 by a user of the data carrier 1. In this connection, the data carrier 1 generates in step S001 a transaction list 001 (list) in which registered transaction data (data) are associated respectively with a transaction designation 002 (name) (GenList(data, name)). The transaction designation 002 serves in this connection as a unique addressing or indexing of the transaction data specified in the transaction list 001 and preferably remains unchanged during the existence of the transaction data. The thus generated transaction list 001 is then electronically transferred to the end device 10 in step S002 and displayed on the display device 11 of the end device 10 (Display(list)) in step S003.

In step S004 the user selects the transaction data of the transaction desired by him from the displayed transaction data list 001 (SelectData), for example by inputting the fixed transaction designation 002 of the desired transaction data via the input device 14. The input transaction designation 002 is then electronically transferred to the data carrier 1 in step S005, In step S006 the control device 7 ascertains the transaction data associated with the electronically received transaction designation 002, on the basis of the transaction list 001 stored e.g. in the flash memory 5 (FetchData(name)).

In step S007 a digital transaction acoustic signal 003 (audio1) is generated by the control device 7 from the user acoustic signal 8 reproducing the user-specific melody (melody) and stored in the flash memory 5, by the transaction data taken from the transaction list 001 in step S006, which have hitherto been present only in text form, first being converted to a digital speech audio signal, which is subsequently acoustically superimposed with the user acoustic signal 8 present in the flash memory 5, in order to thereby generate a transaction acoustic signal 003 (GenAudio1(melody, data)) upon whose acoustic reproduction the converted transaction data are reproduced superimposed acoustically with the user-specific melody.

In the thus generated transaction acoustic signal 003, the user-specific melody and the speech acoustic signal of the transaction data are linked with each other such that there can be extracted therefrom no acoustic signal which acoustically reproduces either only the user-specific melody or only the transaction data. In particular, the user-specific melody and the speech acoustic signal of the transaction data are linked with each other such that the two begin and end substantially simultaneously upon an acoustic reproduction of the transaction acoustic signal 003. The generated transaction acoustic signal 003 is then transferred to the end device 10 in step S008 and acoustically reproduced there in step S009 (Play(audio1)).

Finally, the user grants clearance of the transaction data in step S010 (Clearance), provided that he can ascertain upon the reproduction of the transaction acoustic signal 003 in step S004 an at least partial match of the acoustically reproduced melody with the user-specific melody, on the one hand, and a match of the acoustically reproduced transaction data with the transaction data selected by the user in step S004, on the other hand. Through a correct reproduction of the melody known to the user and of the transaction data selected by him, the user recognizes that the data communication connection between his data carrier 1 and the end device 10, as well as the end device itself, are untampered-with and thus trustworthy. The user can thus be sure that the transaction data selected by him in step S004 have arrived at the data carrier 1 correctly.

The clearance in step S010 can be effected for example by inputting a given clearance text via the input device 14 or by a certain keystroke or another one-sided action of the user vis-à-vis the end device 10, whereupon the transaction data are finally processed in step S011 (Process(data)).

FIG. 2a illustrates a method variant of the clearance method shown in FIG. 2, in which, inter alia, the grant of clearance shown in step S010 of FIG. 2 (corresponding to step S112 in FIG. 2a) is verified on the data carrier side again by the user. Accordingly, steps S101 to S112 constitute a first method portion up to the grant of clearance vis-à-vis the end device 10, while steps S113 to S121 represent a second method portion, which relates to the verification or confirmation of the grant of clearance on the basis of a transaction identification generated in step S101.

As in step S001 of FIG. 2, the data carrier 1 again generates in step S101 a transaction list 101 (list) with the registered transaction data and their associated transaction designations 102 (GenList(data, name)). Furthermore, in step S101 there is associated with each transaction data set or each transaction designation 102 an individual and unique transaction identification (id) (GenId(list, id)), so that each transaction data set specified in the transaction list 101 has uniquely associated therewith a fixed transaction designation 102, on the one hand, and a variable transaction identification, on the other hand. The transaction identifications can be newly generated and individually associated with the respective transaction data for example regularly or in each case upon generation of a current transaction data list, in order to prevent tampering with the method by interception of transaction identifications.

Steps S102 to S105 of FIG. 2a proceed like steps S002 to S005 of FIG. 2, i.e. the generated transaction list 101 is electronically transferred to the end device 10 (S102) and displayed there (S103), whereupon the user selects the desired transaction data (S104), and the transaction designation 102 input therefor is electronically transferred to the data carrier 1 (S105).

In step S106 the control device 7 ascertains on the basis of the electronically received transaction designation 102 the selected transaction data and the variable transaction identification associated therewith (FetchDataId(name)).

In step S107 there is generated by the control device 7 on the basis of the user acoustic signal 8 stored in the flash memory 5 a digital transaction acoustic signal 103 (audio 1) which reproduces the user-specific melody and in each case one speech acoustic signal acoustically superimposed with the converted transaction data and with the converted transaction identification (GenAudio1(melody, data, id)). The generated transaction acoustic signal 103 is then transferred to the end device 10 in step S108 and acoustically reproduced there in step S109 (Play(audio1)).

Upon the acoustic reproduction of the transaction acoustic signal 103 in step S109, the user of the data carrier 1 thus hears a speech acoustic signal with the transaction data and a speech acoustic signal with the transaction identification acoustically superimposed with the user-specific melody. Thereupon, in step S110, the user inputs to the end device 10 via the input device 14 the acoustically reproduced transaction identification 104 (id') recognized by him (Enter(id')), provided that he ascertains an at least partial match of the reproduced melody with the user-specific melody and a match of the reproduced transaction data with the transaction data selected by him. Inputting the acoustically reproduced transaction identification 104 thus represents the grant of clearance by the user, who thereby confirms that the data carrier 1 has received the selected transaction data from the end device 10 correctly and untampered-with in step S105.

The input transaction identification 104 is subsequently transferred electronically to the data carrier 1 in step S111, whereupon the latter in step S112 compares the transaction identification 104 input by the user with the transaction identification generated by the data carrier 1 in step S101 (Cmp(id', id)). If a match of the input transaction identification with that generated is ascertained upon this comparison, the data communication connection between the insecure end device 10 and the portable data carrier 1, and the end device 10 itself, are deemed trustworthy.

In the following steps S113 to S121 the clearance is verified by the user once again, and a processing of the selected transaction data is finally prompted. In this connection an extended clearance verification can comprise the sketched steps S113 to S121, while a simplified clearance confirmation can also comprise only steps S119 to S121. In the latter case, step S112 could also be followed immediately by step S119.

Upon the grant of clearance sketched in FIG. 2a, two digital acoustic signals 105 (audio2) and 106 (audio3) are generated in step S113 (GenAudio2(melody, data); GenAudio3(melody, code)), whereby one of the acoustic signals 105 reproduces the transaction data selected by the user as a speech acoustic signal acoustically superimposed with the user-specific melody, and the other acoustic signal 106 reproduces a clearance code (code) as a speech acoustic signal acoustically superimposed with the user-specific melody. The latter will hereinafter also be designated a clearance acoustic signal. Alternatively, there can also be generated a common clearance acoustic signal (as in step S107), which reproduces distinguishably perceptibly both a speech acoustic signal of the transaction data and of the clearance code acoustically superimposed with the user-specific melody. On the other hand, the acoustic signal 105 can also be omitted, because the acoustic reproduction of the transaction data has already been effected in steps S107 to S109 and serves only the purpose of a recheck by the user here. The clearance code can in this connection be arbitrary information, for example a random numeric or character string or a word which is unknown to the user at this time.

In step S115, the two acoustic signals 105, 106 are reproduced via the reproducing device 12 of the end device 10 (Play(audio2); Play(audio3)), so that there is rendered to the user the user-specific melody known to him and, substantially simultaneously, the clearance code hitherto unknown to him, and optionally for checking purposes also the transaction data. The final clearance for the processing of the transaction data is then initiated in step S116 by the user inputting via the input device 14 the clearance code 107 (code) recognized by him as a result of the acoustic reproduction (Enter(code')), said code being transferred to the data carrier 1 in step S117, and compared there in step S118 with the clearance code generated in step S113 (Cmp(code', code)). If this comparison yields a positive result, the data carrier 1 generates a clearance signal 108 (clear) in step S119 (GenClearance) and sends it to the end device 10 in step S120, whereupon the transaction data are finally processed in step S121 (Process (data)), and the transaction is thereby executed. In this connection the clearance signal 108 generated in step S119 can for example correspond to, or comprise, the clearance code generated in step S113 or be an arbitrary other confirmation signal in which further data are integrated, e.g. again the transaction data to be processed, a cryptographic signature or the like.

FIG. 2b illustrates a further implementation variant of the method for clearing transaction data according to FIG. 2, whereby again steps S201 to S212 represent a first method portion until the grant of clearance vis-à-vis the end device 10, and the grant of clearance by the data carrier 1 is confirmed with steps S213 to S216.

Steps S201 to S212 of FIG. 2b proceed largely like steps S101 to S112 of FIG. 2a. In step S201 a transaction list 201 (list) is generated from registered transaction data (data) and their firmly associated transaction designations 202 (name) (GenList (data, name)), and in step S202 sent to the end device 10 for display on a display device 11 in step S203 (Display (list)). In step S204 the user selects the desired transaction data on the basis of the associated transaction designation 202 (SelectData), which is then sent to the data carrier 1 in step S205.

Departing from steps S101 and S106 of FIG. 2a, the individual transaction identification is generated individually as a random number or random character string (GenRndid (name)) in the method according to FIG. 2b only after the receipt of the transaction designation 202 of the selected transaction data in step S206 (and not already in step S201 for the total transaction list as in FIG. 2a). Further, in step S206 the transaction data and the associated transaction identification are made available for the subsequent generation of the transaction acoustic signal 103 (FetchDataRndid(name)).

In step S207 there is then generated the transaction acoustic signal 203 (audio1) which reproduces the selected transaction data and the just generated transaction identification as speech acoustic signals acoustically superimposed with the user-specific melody (GenAudio1(melody, data, rndid)), which is then sent to the end device 10 in step S208 and reproduced there via the reproducing device 12 in step S209 (Play(audio1)). The user confirms in step S210 the at least partial match of the melody reproduced by the end device 10 with the user-specific melody known to him and the match of the reproduced transaction data with the selected transaction data, by inputting the recognized random transaction identification 204 (rndid') to the end device 10 (Enter(rndid')), which is transferred to the data carrier 1 in step S211 and compared there in step S212 with the transaction identification generated in step S206.

In the case of a positive comparison result in step S212, there is generated in step S213 a clearance data signal 205 (clear) which comprises at least the selected transaction data, but preferably additionally a cryptographic signature (sig), generated with a suitable (private) signature key, of the user or of the data carrier 1 (GenClearance(data, sig)). After the receipt of the clearance data signal 205 the end device 10 checks the signature in step S215 (VerifySig), for example with a (public) verification key corresponding to the signature key, whereupon the transaction is finally executed in step S216 by processing of the selected transaction data (Process (data)).

In contrast to the clearance method according to FIG. 2, there is generated by the data carrier 1 in the clearance methods according to FIGS. 2a and 2b in each case a transaction identification which is unknown and uniquely linked with the selected transaction data (step S101 or S206), which is acoustically reproduced by the end device 10 (step S109 or S209). While in the clearance method according to FIG. 2 the clearance confirmation is effected only by a one-sided and always identical confirmation by the user (step S010), e.g. by pressing a clearance button on the end device 10, there can be effected in the clearance methods according to FIGS. 2a and 2b a more complex clearance verification or clearance confirmation on the basis of the unknown and transaction-individual transaction identification, which is initiated with the input of the reproduced transaction identification 104, 204 by the user (step S110 or S210) and the check of the input transaction identification 104, 204 by the data carrier 1 (step S112 or S212).

In the methods sketched in FIGS. 2a and 2b it is therefore readily possible to interchange or to combine the method portions for clearance verification or clearance confirmation (in FIG. 2a steps S113 to S21 or S119 to S121 and in FIG. 2b steps S213 to S216). Likewise, it is possible to skip steps S113 to S116 upon the clearance verification according to FIG. 2a and to generate the clearance signal 108 according to step S119 immediately after the check of the input transaction identification 104 in step S112. Further, it is also possible to provide an alternative clearance confirmation by steps S213 to S216 after the clearance verification with steps S113 to S118 of FIG. 2a instead of the clearance confirmation by steps S119 to S121.

FIG. 3 finally illustrates a method for registering transaction data on the data carrier 1 which define a hitherto impossible transaction desired by the user on the end device 10. For this purpose, the data carrier 1 generates in step S301 an input mask 301 (mask) for input of the transaction data 302 (Gen-Mask), which is transferred to the end device 10 in step S302 and displayed there on the display device 11 in step S303 (Display(mask)). The user inputs the desired transaction data 302 in the displayed input mask 301 in step S304 (Enter (data)), and the data carrier 1 accepts the input transaction data 302 in step S305.

In step S307 there is generated a transaction acoustic signal 303 (audio4) which reproduces a speech acoustic signal of the (converted) transaction data 302 to be newly registered, acoustically superimposed with the user-specific melody (GenAudio4(melody, data)). The transaction acoustic signal 303 is transferred to the end device 10 in step S308 and reproduced there in step S309 (Play(audio4)). The user then confirms in step S310 by a keystroke or another one-sided, consistent confirmation vis-à-vis the end device 10 (Clearance) that the reproduced melody and the reproduced transaction data correspond respectively to the user-specific melody and the transaction data 302 to be newly registered specified in step S304. Thereupon, a registration confirmation signal 304 (clear) is sent in step S311 to the data carrier 1, which finally registers the transaction data 302 in step S313, e.g. by their being entered in a transaction database on the basis of which the transaction list is generated in step S001, S101 or S201 of FIG. 2, 2a or 2b. The registration method according to FIG. 3 can then be followed by a clearance method according to FIG. 2, 2a or 2b for processing the now registered transaction data 302.

FIG. 3a illustrates a method variant of the registration method of FIG. 2a, in which a transaction identification according to the same principle is used for registration confirmation as in FIGS. 2a and 2b for clearance confirmation. In so doing, steps S301 to S305 are as in FIG. 3.

Departing from the method according to FIG. 3, an individual transaction identification is generated and uniquely associated with the input transaction data 302 in step S306 (GenId(data)) in the method illustrated in FIG. 3a. In step S307 there is then generated a transaction acoustic signal 303 (audio4) which reproduces a speech acoustic signal of the input transaction data 302 and a speech acoustic signal of the transaction identification assigned in step S306 acoustically superimposed with the user-specific melody (GenAudio4 (melody, data id)). After the reproduction in step S309 of the transaction acoustic signal 303 transferred to the end device 10 in step S308 (Play(audio4)), the user then confirms in step S310 that the reproduced melody corresponds at least partly to the user-specific melody known to him and that the reproduced transaction data match the transaction data 302 to be newly registered input by him, by the user inputting the transaction identification 304 (id') likewise reproduced and recognized by him to the input device 14 of the end device 10 (Enter(id')). The input transaction identification 304 is transferred to the data carrier 1 in step S311.

If the data carrier in step S312 finally ascertains a match between the input transaction identification 304 and the transaction identification generated in step S306 for the transaction data 302 to be newly registered, the transaction data 302 are finally registered by the data carrier 1 in step S313.

For further individualization of the transaction acoustic signal it is also possible, in addition to the user-specific melody of the user acoustic signal 8, to user-individualize the speech acoustic signal with the transaction data and/or the transaction identification and/or the clearance code, e.g. by the user's voice or other individualizing acoustic effects being taken into consideration upon the acoustic conversion of the particular character/text sequence. It is thus possible for example to record a recitation (e.g. reading or singing) of the relevant character/text sequence by the user.

To increase the data tamper resistance in particular upon the transfer of acoustic information acoustically reproduced and input by the user to the end device 10 in steps S111, S117, S211 and S311, it is conceivable to transfer the corresponding text information (e.g. the transaction identification 104, 205, 304 in steps S111, S214, S311 or the clearance code in step S117) in concealed fashion. This can be effected for example through a linkage of the text information with concealment data known to the data carrier 1, e.g. with a transaction number (TAN) of the user, which the data carrier 1 can cancel. The use of a TAN or of similar concealment data that are variable and uniquely associated with the user has the additional effect that the user, through the knowledge thereof, can additionally authenticate himself to the data carrier 1.

To further increase the data communication security, it is in principle possible, in each of the data communication steps stated in connection with the illustrated methods, to transfer the data in encrypted form and subsequently decrypt them for further processing. This can relate to both the transfer of data signals and of acoustic signals. The encryption can be effected here both symmetrically and asymmetrically, e.g. by means of corresponding private and public keys present on the data carrier 1 and on the end device 10.

In the hitherto described embodiments, it was initially assumed that the reproduction of acoustic signals is effected by the end device in which the data carrier is inserted during the transaction.

However, it is fundamentally conceivable that the data carrier is removed from the end device and inserted for reproduction of the acoustic signal into a further device, preferably a reproducer for multimedia data. The user defines the transaction data while employing the end device and checks the transaction data with the help of the reproducer on the basis of the acoustic signal reproduced to him.

This principle is furthermore applicable regardless of the specific signal type. That is, the analogous advantage can be obtained when the data carrier generates an image signal, which is then displayed in the reproducer, for example in the form of a digital picture frame.

When the data carrier for example embeds the transaction data and a transaction number TAN in an image (or an acoustic signal), the user can verify the transaction data displayed (reproduced) to him on the reproducer. When he has recognized the transaction data, he inputs on the end device the TAN that he has recognized in the image displayed to him on the reproducer. The transaction is preferably only cleared when the data carrier has received as a clearance confirmation the TAN embedded thereby in the image (acoustic signal).

The use of a separate reproducer initially has the advantage that an attacker of the system would have to modify two devices in parallel in mutually coordinated fashion.

The reproducer can be of very simple configuration and preferably comprises in particular no transaction capability and/or no network link, in particular not to the data network and/or communication network employed for the transaction. Because the reproducer can be a simple standard device on which no adaptation is necessary, there arise further advantages. Such a suitable reproducer will normally be available everywhere. Moreover, it is unlikely that such a simple device can be attacked in the same way as the end device, or can be attacked at all, because it for example does not comprise the capability to load and/or modify its software.

In the hitherto described embodiments it was further initially assumed that the transaction acoustic signal is generated in the data carrier and is transferred from the data carrier to the end device.

It would be slightly less secure if a central authority of the transaction system, preferably a server, generates the transaction acoustic signal and transfers it to the data carrier. The transaction acoustic signal is, in so doing, transferred via a secure end-to-end connection between data carrier and server. Such connections are well enough known. Optionally, the transaction data and/or the user-specific melody are previously transferred from the data carrier to the server via this connection. In this embodiment too, the end device further obtains the transaction acoustic signal from the data carrier, i.e. from a trustworthy authority.

The method in a portable data carrier for clearing transaction data selected for a processing would be characterized in that the data carrier receives a transaction acoustic signal via a secure data connection from a central authority of the transaction system, upon whose acoustic reproduction by an end device at least transaction data selected for the processing are reproduced superimposed acoustically with a melody specific to a user of the data carrier, and electronically transfers the transaction acoustic signal to the end device. This modification is applicable to all hitherto described embodiments.

The invention claimed is:

1. A method in a portable data carrier of a user for clearing transaction data selected by the user for a processing, the method comprising the steps:
   supplying by the data carrier a transaction identification uniquely linked with the transaction data;
   generating by the data carrier a transaction acoustic signal, the transaction acoustic signal being configured to produce, upon acoustic reproduction of the transaction acoustic signal by an end device, the selected transaction data of the transaction to be cleared and the transaction identification both superimposed acoustically with a melody specific to the user of the data carrier;
   electronically transferring by the data carrier the transaction acoustic signal to the end device;
   comparing by the data carrier an electronically received transaction identification with the supplied transaction identification, the data carrier receiving the transaction identification from the end device as confirmation both of an at least partial match of the melody acoustically reproduced by the end device with the user-specific melody and of a match of the transaction data acoustically reproduced by the end device with the selected transaction data,
   wherein, upon the acoustic reproduction of the transaction acoustic signal by an end device with the selected transaction data of the transaction to be cleared and the transaction identification superimposed acoustically with the melody specific to the user of the data carrier, said confirmation of said matches is based on a user input to said end device of at least a portion of the transaction identification, and
   electronically transferring by the data carrier a clearance signal to the end device if the received transaction identification matches the supplied transaction identification.

2. The method according to claim 1, including generating via the data carrier such transaction acoustic signal that enables the user, as a result of the reproduction of the transaction acoustic signal by the end device to confirm, for clearing the transaction data, both an at least partial match of the acoustically reproduced melody with the user-specific melody and a match of the acoustically reproduced transaction data with the selected transaction data.

3. The method according to claim 1, including generating via the data carrier the transaction acoustic signal by acoustic superimposition of a user acoustic signal present on the data carrier and reproducing the user-specific melody and a speech acoustic signal reproducing the transaction data.

4. The method according to claim 3, including loading to the data carrier a user acoustic signal which reproduces the user-specific melody determined by the user, such that user acoustic signal reproducing the user-specific melody was either specified by the user or generated from a user-specific melody sung or played by the user.

5. The method according to claim 3, including loading to the data carrier a user acoustic signal which reproduces a commonly known user-specific melody which has been acoustically defamiliarized.

6. The method according to claim 3, including loading to a memory of the data carrier the user acoustic signal reproducing the user-specific melody, and/or an acoustic signal underlying the speech acoustic signal, upon a personalization of the data carrier to its user.

7. The method according to claim 1, wherein the data carrier, before the generation of the transaction acoustic signal, converts the transaction data selected for a processing to a speech acoustic signal.

8. The method according to claim 7, wherein the data carrier electronically receives from the end device the transaction data selected for a processing or a transaction designation uniquely associated with the selected transaction data, and acoustically superimposes the user acoustic signal and the speech acoustic signal which reproduces the transaction data or the transaction data associated with the received transaction designation.

9. The method according to claim 8, wherein the data carrier supplies the transaction identification uniquely linked with the electronically received, selected transaction data or their transaction designation and generates the user acoustic signal such that upon an acoustic reproduction of the generated user acoustic signal the generated transaction identification is also reproduced superimposed acoustically with the user-specific melody, by acoustic superimposition of the user acoustic signal reproducing the user-specific melody and of a speech acoustic signal reproducing the transaction identification.

10. The method according to claim 9, wherein the data carrier electronically receives the transaction identification from the end device as confirmation both of an at least partial match of the melody acoustically reproduced by the end device with the user-specific melody and of a match of the transaction data acoustically reproduced by the end device with the selected transaction data.

11. The method according to claim 10, wherein the data carrier generates as the clearance signal a clearance data signal comprising at least the transaction data and electronically transfers it to the end device for clearing the transaction data.

12. The method according to claim 1, wherein the data carrier generates a clearance acoustic signal upon whose acoustic reproduction by the end device at least the clearance code generated by the data carrier is reproduced superimposed acoustically with the user-specific melody, and electronically transfers the generated clearance acoustic signal to the end device, whereby the data carrier, in case of a match of a thereupon electronically received clearance code with the generated clearance code, electronically transfers the clearance signal to the end device for clearing the transaction data.

13. The method according to claim 1, wherein the data carrier, for supplying the transaction identification, generates a random transaction identification and links it uniquely with the selected transaction data or their transaction designation.

14. The method according to claim 3, wherein the data carrier creates a transaction list with transaction data selectable for a processing and a transaction designation respectively uniquely associated with the selectable transaction data, electronically transfers the created transaction list to the end device and electronically receives from the end device transaction data selected from the transaction list for a processing or the transaction designation respectively uniquely associated with the selected transaction data.

15. The method according to claim 14, wherein the data carrier, for supplying the transaction identification for the transaction data, generates mutually different transaction identifications upon the creation of the transaction list and respectively uniquely links them with the transaction data or their transaction designations, and determines the transaction identification associated with the selected transaction data.

16. A portable data carrier of a user for clearing transaction data selected by the user for a processing, the portable data carrier comprising:
at least a processor;
a memory; and
a data communication interface for data communication with an end device,
wherein the data carrier is configured to receive a supplied transaction identification uniquely linked with transaction data;
wherein the data carrier includes a control device, the control device being configured to generate a transaction acoustic signal upon an acoustic reproduction of the generated transaction acoustic signal by an end device, the selected transaction data of the transaction to be cleared and the transaction identification both superimposed acoustically with a melody specific to the user of the data carrier, and wherein the data carrier is configured to
transfer the transaction acoustic signal to the end device,
compare an electronically received transaction identification with the supplied transaction identification, the data carrier receiving the transaction identification from the end device as confirmation both of an at least partial match of the melody acoustically reproduced by the end device with the user-specific melody and of a match of the transaction data acoustically reproduced by the end device with the selected transaction data,
wherein, upon the acoustic reproduction of the transaction acoustic signal by an end device with the selected transaction data of the transaction to be cleared and the transaction identification superimposed acoustically with the melody specific to the user of the data carrier, said portable data carrier is configured to receive said confirmation of said matches based on a user input to said end device of at least a portion of the transaction identification, and
transfer a clearance signal to the end device if the received transaction identification matches the supplied transaction identification.

17. The method according to claim 3, wherein the data carrier generates the transaction acoustic signal such that from the transaction acoustic signal there can be extracted at least no speech acoustic signal reproducing the transaction data from the user acoustic signal reproducing the user-specific melody such that upon an acoustic reproduction of a detached speech acoustic signal the transaction data would be reproduced in acoustically recognizable fashion.

18. The method according to claim 1, wherein the clearance signal comprises a cryptographic signature or a clearance code generated by the data carrier.

19. The method according to claim 1, wherein the data carrier generates a transaction acoustic signal upon whose acoustic reproduction by the end device at least transaction data to be newly registered are reproduced superimposed acoustically with the user-specific melody, by acoustic superimposition of the user acoustic signal reproducing the user-specific melody and of a speech acoustic signal reproducing the transaction data to be newly registered, and transfers the generated transaction acoustic signal to the end device, whereby the data carrier registers for a processing the transaction data to be newly registered, provided that the data carrier electronically receives a registration confirmation signal from the end device as confirmation both of an at least partial match of the melody acoustically reproduced by the end device with the user-specific melody and of a match of the transaction data acoustically reproduced by the end device with the transaction data to be newly registered.

20. A method in a portable data carrier for clearing transaction data selected for a processing, comprising the steps:
generating by the data carrier a transaction acoustic signal, the transaction acoustic signal being configured to produce, upon acoustic reproduction of the transaction acoustic signal by an end device, at least acoustical transaction data corresponding to the transaction to be cleared superimposed acoustically with a melody specific to a user of the data carrier; and
electronically transferring the transaction acoustic signal to the end device,
wherein the data carrier generates a transaction acoustic signal upon whose acoustic reproduction by the end device of at least transaction data to be newly registered are reproduced superimposed acoustically with the user-specific melody, by acoustic superimposition of the user acoustic signal reproducing the user-specific melody and of a speech acoustic signal reproducing the transaction data to be newly registered, and transfers the generated transaction acoustic signal to the end device, whereby the data carrier registers for a processing the transaction data to be newly registered, provided that the data carrier electronically receives a registration confirmation signal from the end device as confirmation both of an at least partial match of the melody acoustically reproduced by the end device with the user-specific melody and of a match of the transaction data acoustically reproduced by the end device with the transaction data to be newly registered.

21. A portable data carrier of a user for clearing transaction data selected by the user for a processing, the portable data carrier comprising:
at least a processor;
a memory; and
a data communication interface for data communication with an end device,
wherein the data carrier is configured to receive a supplied transaction identification uniquely linked with transaction data;
wherein the data carrier includes a control device, the control device being configured to generate a transaction acoustic signal, upon an acoustic reproduction of the generated transaction acoustic signal by an end device, the selected transaction data of the transaction to be cleared and the transaction identifier both superimposed acoustically with a melody specific to the user of the data carrier, and wherein the data carrier is configured to
transfer the transaction acoustic signal to the end device,
compare an electronically received transaction identification with the supplied transaction identification, and
transfer a clearance signal to the end device if the received transaction identification matches the supplied transaction identification.

22. A transaction system, comprising a portable data carrier according to claim 21 and an end device which is set up to acoustically reproduce a transaction acoustic signal electronically received from the data carrier, and to process the selected transaction data only when the user of the data carrier confirms via the end device both an at least partial match of the acoustically reproduced melody with the user-specific melody and a match of the acoustically reproduced transaction data with the selected transaction data.

* * * * *